United States Patent
Uyeno et al.

(10) Patent No.: US 10,267,915 B2
(45) Date of Patent: Apr. 23, 2019

(54) OPTICAL SYSTEM FOR OBJECT DETECTION AND LOCATION

(71) Applicant: RAYTHEON COMPANY, Waltham, MA (US)

(72) Inventors: Gerald P. Uyeno, Tucson, AZ (US); Sean D. Keller, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 409 days.

(21) Appl. No.: 15/175,807

(22) Filed: Jun. 7, 2016

(65) Prior Publication Data

US 2017/0350979 A1    Dec. 7, 2017

(51) Int. Cl.
*G01S 17/02* (2006.01)
*G01S 17/66* (2006.01)
(Continued)

(52) U.S. Cl.
CPC .......... *G01S 17/026* (2013.01); *G01S 7/4802* (2013.01); *G01S 7/484* (2013.01); *G01S 7/4813* (2013.01); *G01S 7/4817* (2013.01); *G01S 7/4863* (2013.01); *G01S 7/4865* (2013.01); *G01S 17/10* (2013.01); *G01S 17/42* (2013.01);
(Continued)

(58) Field of Classification Search
CPC .... G01S 7/4802; G01S 7/4813; G01S 7/4817; G01S 7/484; G01S 7/4863; G01S 7/4865; G01S 17/10; G01S 17/42; G01S 17/89; G01S 17/026
See application file for complete search history.

(56) References Cited

U.S. PATENT DOCUMENTS 3,897,150 A * 7/1975 Bridges .................. G01S 17/10
  348/138
4,653,905 A   3/1987 Farrar et al.
(Continued)

FOREIGN PATENT DOCUMENTS

WO   2012/034881 A1   3/2012
WO   2014200581 A2   12/2014

OTHER PUBLICATIONS

Ayral et al., "Phase-Conjugate Nd:YAG Laser with Internal Acousto-Optic Beam Steering", Optics Letters, vol. 16, No. 16, Aug. 15, 1991, pp. 1225-1227.
(Continued)

*Primary Examiner* — Eric L Bolda
(74) *Attorney, Agent, or Firm* — Lando & Anastasi, LLP

(57) ABSTRACT

Optical systems and methods for object detection and location. One example of an optical system includes a laser radar optical source positioned to emit a pulsed laser beam, a non-mechanical beamsteering device positioned to scan the beam in a linear scan over a first area of a scene, a laser radar detector positioned to receive and integrate a reflection of the beam, a read-out integrated circuit (ROIC) configured to provide a first read-out signal based on the integrated reflection, and a controller configured to receive the first read-out signal, determine a range to the first area based on a time of flight of the pulsed laser beam, and identify a presence of an object within the scene based on a signal level of the first read-out signal, the first signal level corresponding to a reflectivity of a portion of the object within the first area of the scene.

14 Claims, 6 Drawing Sheets

(51) Int. Cl.
*G01S 17/42* (2006.01)
*G02F 1/29* (2006.01)
*G01S 7/48* (2006.01)
*G01S 17/89* (2006.01)
*G01S 7/481* (2006.01)
*G01S 7/484* (2006.01)
*G01S 7/486* (2006.01)
*G01S 7/487* (2006.01)
*G01S 17/10* (2006.01)

(52) U.S. Cl.
CPC ............. *G01S 17/89* (2013.01); *G02F 1/292* (2013.01); *G01S 7/4873* (2013.01); *G01S 17/66* (2013.01)

(56) References Cited

U.S. PATENT DOCUMENTS

| | | | |
|---|---|---|---|
| 4,810,088 A | 3/1989 | Karning et al. | |
| 5,005,979 A | 4/1991 | Sontag et al. | |
| 5,682,229 A * | 10/1997 | Wangler | G01S 17/89 348/31 |
| 6,163,372 A | 12/2000 | Sallee et al. | |
| 6,175,383 B1 | 1/2001 | Yadid-Pecht et al. | |
| 6,522,396 B1 | 2/2003 | Halmos | |
| 6,943,873 B2 | 9/2005 | Sallee | |
| 7,583,364 B1 | 9/2009 | Mayor et al. | |
| 7,626,152 B2 | 12/2009 | King et al. | |
| 7,745,771 B2 | 6/2010 | Troxell et al. | |
| 8,237,835 B1 | 8/2012 | Muller | |
| 8,380,025 B2 | 2/2013 | Anderson et al. | |
| 8,400,619 B1 | 3/2013 | Bachrach et al. | |
| 8,463,080 B1 | 6/2013 | Anderson et al. | |
| 8,989,523 B2 | 3/2015 | Anderson et al. | |
| 2002/0117340 A1 * | 8/2002 | Stettner | B60G 17/019 180/169 |
| 2005/0060092 A1 | 3/2005 | Hablani | |
| 2009/0142066 A1 | 6/2009 | Leclair et al. | |
| 2010/0128221 A1 | 5/2010 | Muller et al. | |
| 2013/0021474 A1 | 1/2013 | Taylor et al. | |
| 2014/0152793 A1 | 6/2014 | Staker et al. | |
| 2015/0285625 A1 | 10/2015 | Deane | |
| 2015/0378187 A1 * | 12/2015 | Heck | G02F 1/1326 250/227.21 |
| 2016/0006914 A1 | 1/2016 | Neumann | |

OTHER PUBLICATIONS

Chiu et al., "Shape-Optimized Electrooptic Beam Scanners: Analysis, Design, and Simulation", IEEE, Journal of Light Wave Technology, vol. 17, No. 1, Jan. 1999, pp. 108-114.

Kim et al., "Wide-Angle, Nonmechanical Beam Steering Using Thin Liquid Crystal Polarization Gratings", Proc. of SPIE, vol. 7093, 2008.

International Search Report and Written Opinion for application No. PCT/US2017/026344 dated Jul. 7, 2017.

"SEEOR: Evanescently Coupled Non-mechanical Beam Steering", Vescent Photonics, 2015 [retrieved on Sep. 2, 2016 ], <URL: http://www.vescent.com/wp-content/uploads/2015/04/LS-1uJ7.1.pdf>.

* cited by examiner

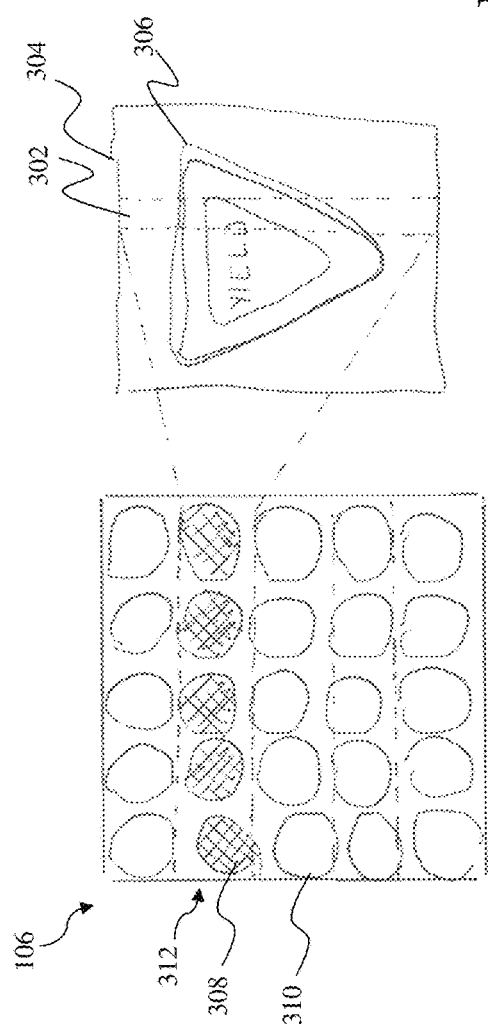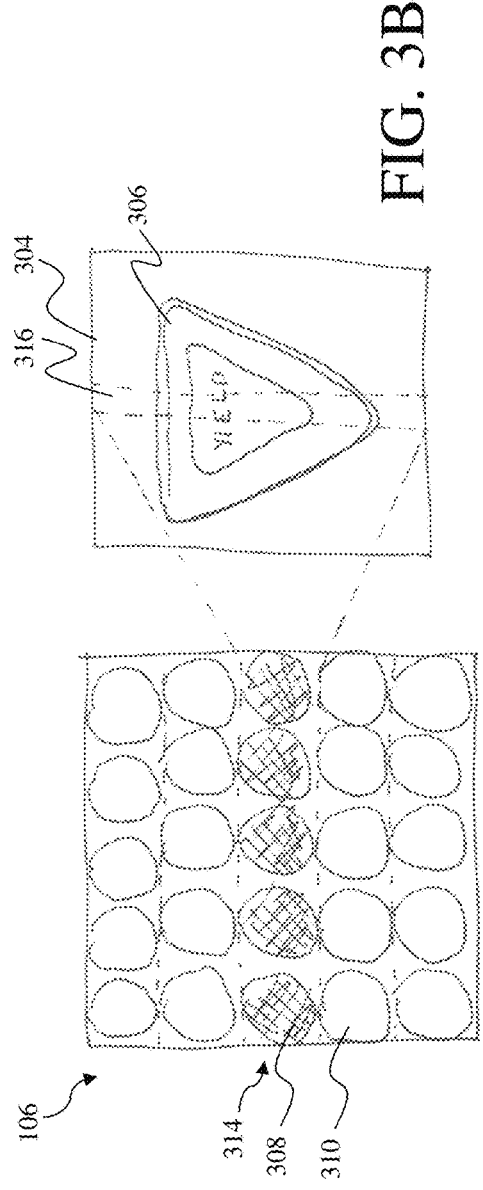

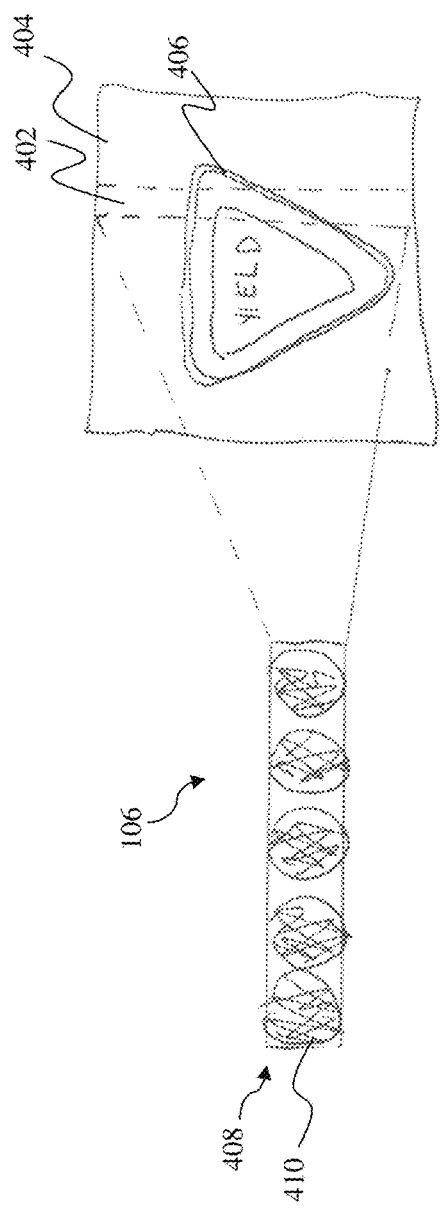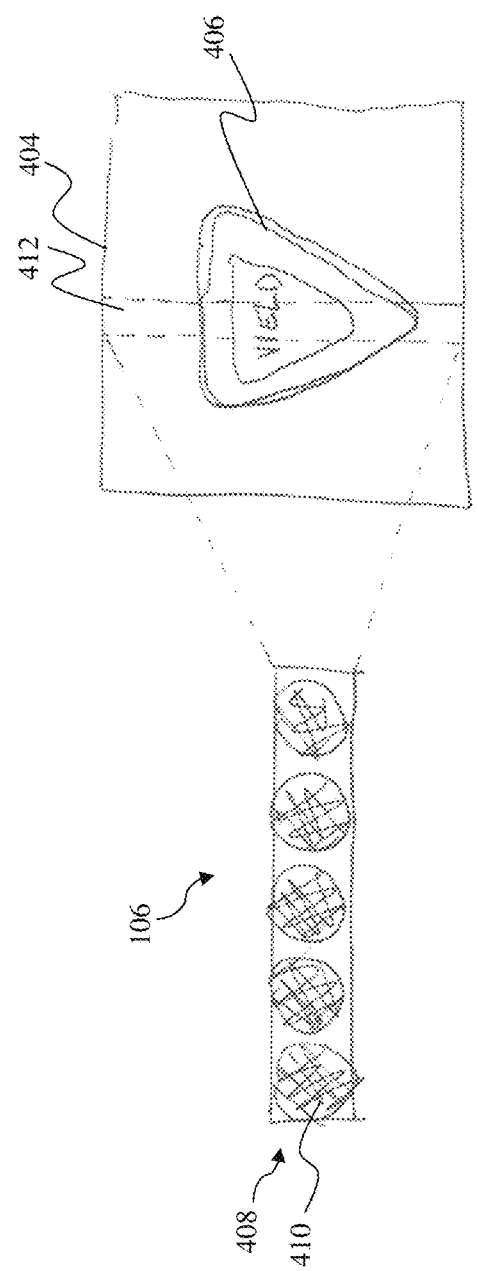

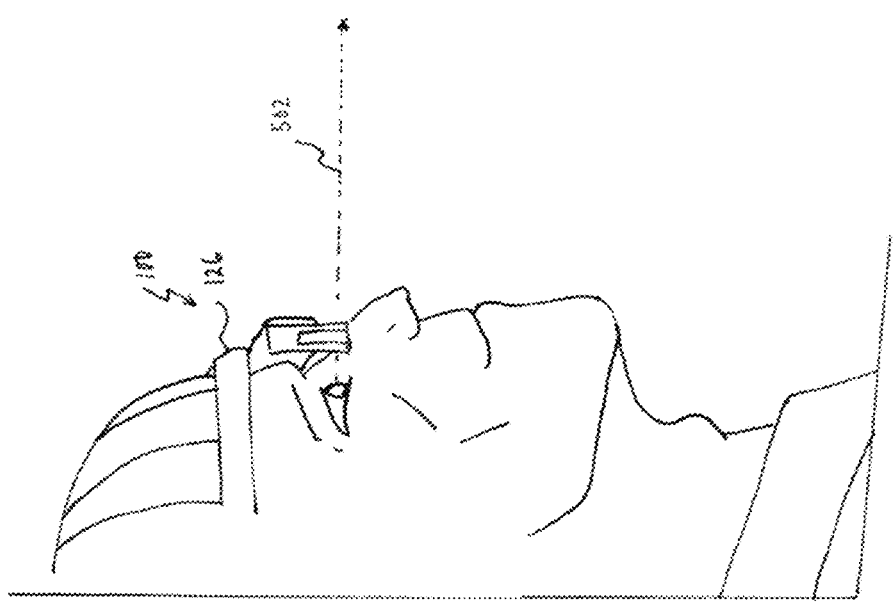

OPTICAL SYSTEM FOR OBJECT DETECTION AND LOCATION

BACKGROUND

Typical active optical systems use laser radiation to detect and locate objects. Such systems detect an object by sensing reflections of laser radiation from the object. After the object has been detected, these systems locate the object by determining an angular location of the object and a range to the object. Conventional active optical systems illuminate an entire field of view of the system instantaneously with sufficient laser energy to detect even the lowest reflective objects within that field of view, and at a maximum desired range. A detector within the optical system includes a given number of pixels, each having a sufficient sensitivity to detect the reflected laser radiation from the entire field of view. The reflected laser radiation is analyzed to determine a distance (i.e., range) to the object. Typically, range is determined by direct detection (e.g., the "time of flight" principle), or by frequency modulation.

The size, weight, and power of a typical active optical system increases with the range and field of view of the active optical system. Longer ranges and wider fields of view require high powered laser sources, which directly increase the required input power and the size of the active optical system. Increases in range and field of view may also require additional components to reject waste heat generated by the high powered laser source. Such components also increase the size, weight, and power of the optical system.

SUMMARY OF THE INVENTION

Aspects and embodiments are generally directed to imaging systems and methods, and in particular to imaging systems and methods for detecting objects in low-visibility and other restricted view conditions. Aspects and embodiments include solid-state active components and/or non-mechanical optical elements for improved size reduction, improved weight reduction, and reduced power consumption during operation. One example of an imaging system includes a non-mechanical beamsteering device positioned to scan a pulsed laser beam in a linear scan over an area of a scene.

As discussed in further detail herein, reflections of the pulsed laser beam from the area of the scene, and reflections from multiple consecutive linear scans over different areas of the scene, may be used to identify the presence of an object within the scene, locate and determine a range to that object, detect a spatial profile of that object, and/or generate an image of that object. In particular examples, the imaging system may locate small objects at great ranges (or other difficult to detect objects) based on the reflective characteristics of the scene and small objects therein. In addition to those benefits discussed herein, various aspects and embodiments provide a reduced weight, size, and power consumption imaging system for ground, mobile, maritime, airborne, and space, imaging environments.

According to certain aspects, provided is an imaging system. In one example, the imaging system includes a laser radar optical source positioned to emit a pulsed laser beam along a fixed optical axis, a non-mechanical beamsteering device positioned along the fixed optical axis to receive the pulsed laser beam from the laser radar optical source and to scan the pulsed laser beam in a first linear scan over a first area of a scene, a laser radar detector positioned to receive and integrate, at a first active portion of the laser radar detector, a reflection of the pulsed laser beam from the first area of the scene, a read-out integrated circuit (ROIC) coupled to the laser radar detector and configured to provide at least a first read-out signal based at least in part on the integrated reflection of the pulsed laser beam corresponding to the first area of the scene, and a controller coupled to the ROIC and configured to receive the first read-out signal, determine a range to the first area of the scene based at least in part on a time of flight of the pulsed laser beam of the first linear scan, and identify a presence of an object within the scene based at least in part on a first signal level of the first read-out signal, the first signal level corresponding to a reflectivity of at least a portion of the object within the first area of the scene.

According to an embodiment, the non-mechanical beamsteering device is further configured to scan the pulsed laser beam in a second linear scan over a second area of the scene, within a frame time, and the laser radar detector is positioned to receive and integrate, at a second active portion of the laser radar detector, a reflection of the pulsed laser beam from the second area of the scene. In one embodiment, the ROIC is further configured to provide at least a second read-out signal based at least in part on the reflection of the pulsed laser beam corresponding to the second area of the scene, and the controller is further configured to receive the second read-out signal and determine a range to the second area of the scene based at least in part on a time of flight of the pulsed laser beam of the second linear scan.

In one embodiment, the controller is further configured to generate an image of the object within the scene based at least in part on the range to the first area of the scene and the range to the second area of the scene. According to an embodiment, the controller is further configured to detect a spatial profile of the object, and aggregate object data based at least in part on the detected spatial profile.

According to one embodiment, the controller is further configured to generate an average signal level for the scene, the average signal level corresponding to an average of at least the first signal level of the first read-out signal and a signal level of the second read-out signal. In an embodiment, in identifying the presence of the object, the controller is further configured to compare the first signal level and the average signal level for the scene and detect a disparity between the first signal level and the average signal level.

In one embodiment, the non-mechanical beamsteering device is further configured to synchronize at least the first linear scan to correspond to the first active portion of the laser radar detector. In an embodiment, the photodetector includes a single linear array of detector elements. According to an embodiment, the non-mechanical beamsteering device, the laser radar detector, and the ROTC are configured to operate in accordance with a search and track mode of operation, and during the search and track mode of operation the non-mechanical beamsteering device and laser radar detector are synchronized.

According to an aspect, provided is a method for optical imaging. In one example, the method includes emitting from a laser radar optical source a pulsed laser beam along a fixed optical axis, scanning with a non-mechanical beamsteering device the pulsed laser beam in a first linear scan over a first area of a scene, receiving and integrating, at a first active portion of a laser radar detector, a reflection of the pulsed laser beam from the first area of the scene, providing at least a first read-out signal from a read-out integrated circuit (ROTC) coupled to the laser radar detector, the first read-out signal being based at least in part on the integrated reflection of the pulsed laser beam corresponding to the first area of the scene, determining a range to the first area of the scene based at least in part on a time of flight of the pulsed laser beam of the first linear scan, and identifying whether an object is present within the scene based at least in part on a first signal level of the first read-out signal, the first signal level corresponding to a reflectivity of at least a portion of the object within the first area of the scene.

According to an embodiment, the method further includes scanning the pulsed laser beam in at least a second linear scan over a second area of the scene, within a frame time, and receiving and integrating, at a second active portion of the laser radar detector, a reflection of the pulsed laser beam from the second area of the scene. In one embodiment, the method further includes providing at least a second read-out signal from the ROIC based at least in part on a reflection of the pulsed laser beam corresponding to the second area of the scene, and determining a range to the second area of the scene based at least in part on a time of flight of the pulsed laser beam of the second linear scan.

In one embodiment, the method further includes generating an image of the object based at least in part on the range to the first area of the scene and the range to the second area of the scene. According to an embodiment, the method further includes detecting a spatial profile of the object, and aggregating object data based at least in part on the detected spatial profile. In one embodiment, the method further includes generating an average signal level for the scene, the average signal level corresponding to an average of at least the first signal level of the first read-out signal and a signal level of the second read-out signal, and identifying the presence of the object further includes comparing the first signal level and the average signal level and detecting a disparity between the first signal level and the average signal level.

According to an aspect, provided is an imaging system. In one example, the imaging system includes a laser radar optical source positioned to emit a pulsed laser beam, a non-mechanical beamsteering device positioned to receive the pulsed laser beam from the laser radar optical source, the non-mechanical beamsteering device being configured to scan the pulsed laser beam in a first linear scan over a first area of a scene including at least a portion of an object, a laser radar detector positioned to receive and integrate, at an active portion of the laser radar detector, a reflection of the pulsed laser beam from the first area of the scene, a boresight of the laser radar detector is fixed to a line of sight of an operator, a read-out integrated circuit (ROIC) configured to provide at least a first read-out signal based at least in part on the integrated reflection of the pulsed laser beam corresponding to the first area of the scene, a controller coupled to the ROIC and configured to receive the first read-out signal, determine a range to the first portion of the object based at least in part on a time of flight of the pulsed laser beam of the first linear scan, and identify a presence of the object within the scene based at least in part on a first signal level of the first read-out signal, the first signal level corresponding to a reflectivity of the portion of the object within the first area of the scene, and a housing configured to couple the imaging system to the operator.

According to an embodiment, the housing includes at least one of a goggle housing, a vehicle-mount housing, and a machinery-mount housing. In one embodiment, the non-mechanical beamsteering device is further configured to scan the pulsed laser beam in at least a second linear scan over a second area of the scene, and the ROIC is further configured to provide a second read-out signal based at least in part on a reflection of the pulsed laser beam corresponding to the second area of the scene. In an embodiment, the non-mechanical beamsteering device, the laser radar detector, and the ROIC, are configured to operate in accordance with a search and track mode of operation, and during the search and track mode of operation the non-mechanical beamsteering device and laser radar detector are synchronized.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 3A and 3B are additional example illustrations of operation of the imaging system shown in FIG. 1, according to aspects of the invention;

FIGS. 4A and 4B are further example illustrations of operation of the imaging system shown in FIG. 1, according to aspects of the invention;

FIG. 5 shows an example side profile of an operator wearing the example imaging system shown in FIG. 1, according to aspects of the invention.

DETAILED DESCRIPTION

Figure 1:
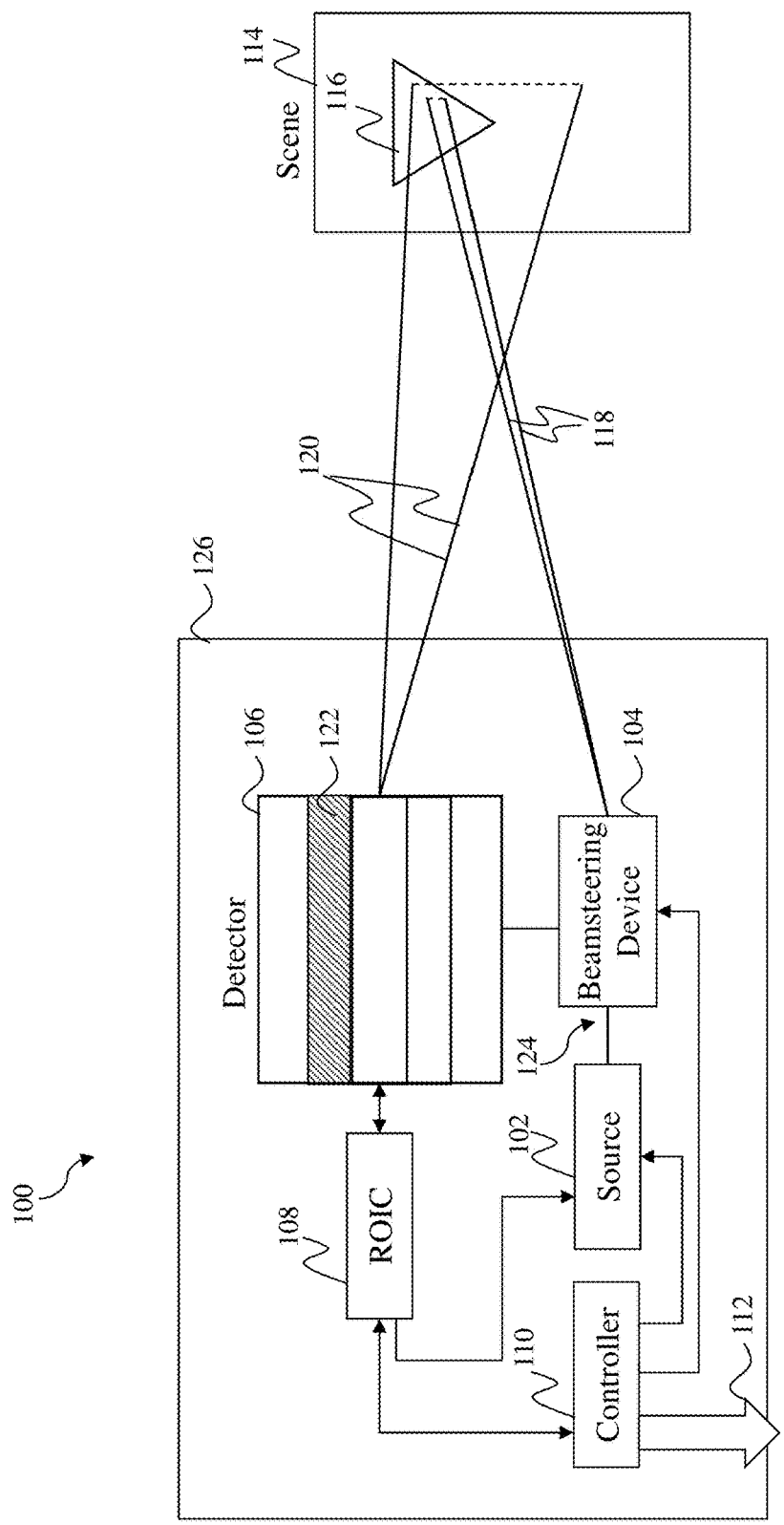
FIG. 1 is a block diagram of an example imaging system according to aspects of the invention.

Aspects and embodiments relate to optical systems and methods of using the same. In particular, aspects and embodiments are directed to laser radar imaging systems and methods for detecting objects at long ranges, in low-visibility conditions, and in other restricted view conditions. Various embodiments include solid-state active components and/or non-mechanical optical elements for improved weight reduction and reduced power consumption during such conditions. As further discussed below, reflections of one or more scanned pulsed laser beams from an illuminated area of a scene may be used to identify the presence of an object in the scene, locate and determine an angular-range and distance (i.e., range) to the object, detect a spatial profile of the object, and generate an image of the object. In particular examples, the imaging system may locate small objects at great ranges (or other difficult to detect objects) based on a comparison of one or more signal levels corresponding to the reflections of the one or more scanned pulsed laser beams. Specifically, signal levels corresponding to highly reflective areas (e.g., the object) may be compared to an average signal level of the scene to identify the presence of the object. Further, components of the imaging system may synchronize the one or more linear scans performed by a non-mechanical beamsteering device of the imaging system to correspond to an active portion of a detector. Accordingly, in addition to reducing the weight and size of the imaging system, synchronized scans may significantly improve the power consumption of the imaging system, when compared to conventional imaging systems.

As discussed above, during various conventional approaches to range finding, a laser source is positioned to illuminate an entire scene within a field of view (FOV) of the optical system. Such an approach not only consumes a great deal of power when providing the intensity and pattern of illumination necessary for range finding operations at great distances, but also makes detection of objects, such as signs, difficult. Decreased visibility of the scene as a result of environmental conditions, movement of the scene or system, or other operating conditions, can also significantly increase the difficulty and complexity in determining an accurate range, or generating an accurate image of those objects.

Some advanced active optical systems incorporate laser beam steering in an attempt to reduce the power of the optical system, while improving the ability to detect and locate objects. Conventional approaches have suggested positioning beamforming optics on a gimbal system, which would allow the system to steer illumination to only those areas of the scene desired for imaging, and hence, reduce the power consumption and improve the accuracy of the system. Unfortunately, such complex mechanical structures increase the cost and weight of the imaging system significantly, making mobile, maritime, airborne, and space applications much less practical.

Accordingly, various implementations of the improved imaging system described herein include a non-mechanical beamsteering device configured to steer a pulsed laser beam generated by a laser radar optical source in one or more linear scans over an area of a scene. In particular, one or more linear scans may be performed rapidly to precisely detect and locate an object within that scene. Non-mechanical beam-steering allows a significant reduction in the size, weight and power of the system, as only a small fraction of the field of view is illuminated at any instant in time. This reduces the required input power to the laser radar optical source, the size of the system, and removes the need for equipment that dissipates waste heat.

As further discussed below, non-mechanical beam-steering also provides improved overall performance of the imaging systems. Objects of interest within the field of view of the imaging system are often not uniformly distributed within the field of view. Non-mechanical beam-steering enables the illumination to be optimized and prioritized to maximize the system performance of detecting and locating such objects. For example, the laser can be scanned continuously across the field of view to identify the presence of an object within the scene, locate, and determine a range to that object. Furthermore, once an object has been detected, non-mechanical beamsteering allows the object to be tracked and further interrogated. Accordingly, various aspects and embodiments are directed to an imaging system configured to efficiently detect and locate objects, while maintaining a reduced size, weight, and power consumption when compared to conventional optical systems.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a block diagram of an example imaging system 100 in accordance with various aspects and embodiments discussed herein. Among other components, the imaging system 100 may include a laser radar optical source 102, a non-mechanical beamsteering device 104, a laser radar detector 106, a read-out integrated circuit (ROIC) 108, and a control circuit. In certain embodiments, the optical system 100 may further include additional optical or electrical components such as lenses, filters, and amplifiers, not shown in FIG. 1. As shown, the laser radar optical source 102 may be positioned along a fixed optical axis (indicated generally by arrow 124), and optically coupled to the non-mechanical beamsteering device 104. In various embodiments, the control circuit includes a controller 110 coupled and in communication with the ROIC 108, the non-mechanical beamsteering device 104, and the laser radar optical source 102. The controller 110 may also include an output node configured to provide on or more outputs (shown generally as indicator 112). As shown, the ROIC 108 may also be coupled to the laser radar detector 106.

Though the components of the example imaging system 100 shown in FIG. 1 may be shown and described as discrete elements in a block diagram, and may be referred to as "circuitry" or "circuit," unless otherwise indicated, the components may be implemented as one of, or a combination of, analog circuitry, digital circuitry, or one or more microprocessors executing software instructions. The software instructions may include digital signal processing (DSP) instructions. Unless otherwise indicated, signal lines between components of the system 100 may be implemented as discrete analog, digital, or optical signal lines. Some of the processing operations may be expressed in terms of calculations or determinations by the controller 110 or other components. The equivalent of calculating and determining values, images, or other elements, can be performed by any suitable analog or digital signal processing techniques and are included within the scope of this disclosure. Such techniques are further discussed with reference to the controller 110 below. Unless otherwise indicated, control signals may be encoded in either digital or analog form;

conventional digital-to-analog or analog-to-digital converters may be included, but are omitted from FIG. 1 to simplify explanation.

In various embodiments, the laser radar optical source 102 is in optical communication with the non-mechanical beamsteering device 104 and positioned to emit a pulsed laser beam along the fixed optical axis 124. While in various embodiments, the laser radar optical source 102 may include any suitable source of optical radiation. In particular embodiments, the laser radar optical source 102 includes a source of near-infrared (NIR) light. For example, the laser radar optical source 102 may include a diode laser configured to emit a pulsed laser beam having at an eye-safe wavelength of 1,550 nm. However, in various other embodiments other wavelengths may be used, such as 1,064 nm pulsed laser beam. In one particular implementation, the laser radar optical source 102 may emit a pulsed laser beam at 10, at pulse width of 10 nanoseconds, and a repetition rate of 10 kHz. Such a beam may enable detection of objects, such as signs, with autonomous vehicles, such as motor vehicles, railed vehicles, or watercrafts.

As FIG. 1 shows, the non-mechanical beamsteering device 104 may be positioned along the fixed optical axis 124 to receive the pulsed laser beam from the laser radar optical source 102. For example, the non-mechanical beamsteering device 104 may receive the pulsed laser beam by an optical fiber or free space coupling. Responsive to receiving the pulsed laser beam from the laser radar optical source 102, the non-mechanical beamsteering device 104 is controlled to scan the pulsed laser beam in one or more linear scans over an area of a scene (e.g., scene 114). For instance, the non-mechanical beamsteering device 104 may receive one or more control signals, such as an applied voltage, from the controller 110 to adjust a refractive index of the non-mechanical beamsteering device 104 and adjust a direction of the scan. In various embodiments, the area of the scene over which the pulsed laser beam is scanned is less than an entire span of the scene 114.

In certain embodiments, scanning the pulsed laser beam in a linear scan over an area of the scene 114 may include scanning the pulsed laser beam over at least a first portion of an object (e.g., a sign 116) within that area. FIG. 1 shows a triangular shaped sign 116 within the example scene 114 for convenience of description. As referred to herein, signs may include any informational object or device, such as traffic signs. In particular embodiments, objects may be small in size relative to the entire span of the scene 114. For example, in one application, a sign may cover less than 5% of an entire area of a field of view of the laser radar detector 106. For at least this reason, signs are challenging to accurately locate and image, and can be especially challenging when visibility is reduced.

As discussed in further detail below with reference to at least FIGS. 3A-3B and FIGS. 4A-4B, in certain embodiments, the non-mechanical beamsteering device 104 may be controlled to perform one or more consecutive linear scans over the scene 114, each linear scan corresponding to a different area of the scene 114. For instance, the non-mechanical beamsteering device 104 may be controlled to scan the pulsed laser beam over a first area of the scene 114, and responsive to completing the scan, scan the pulsed laser beam over a second area of the scene 114. Such a process may be repeated for any number of desired scans, or until an entire spatial profile of the object is detected. Furthermore, one or more linear scans may be retraced for a previously scanned area to obtain further image data regarding that area of the scene 114. Accordingly, with each consecutive linear scan of the non-mechanical beamsteering device 104 over a different area of the scene 114, the pulsed laser beam may be directed at different portions of the object within that scene 114. While discussed in certain examples as being configured to perform linear scans, in certain other implementations, the non-mechanical beamsteering device 104 may be controlled to perform one or more spot scans over the scene 114 to achieve the same effect.

In FIG. 1, the beamwidth of the pulsed laser beam is illustrated by lines 118, and a field of view of the laser radar detector 106 is illustrated as lines 120. As shown, the non-mechanical beamsteering device 104 is configured to direct the pulsed laser beam within the field of view of the laser radar detector 106. In particular, the area scanned (i.e., illuminated) by the pulsed laser beam may be less than the field of view of the laser radar detector 106. In certain embodiments, the non-mechanical beamsteering device 104 is configured to synchronize at least one or more linear scans of the pulsed laser beam with an activated portion of the laser radar detector 106. For instance, the non-mechanical beamsteering device 104 may direct the first linear scan over only the area of the scene corresponding to the active portion of the laser radar detector 106. That, is in various embodiments the field of view of the active section of the laser radar detector 106 may define the area of the scene illuminated by the first linear scan.

In various embodiments, the non-mechanical beamsteering device 104 includes a solid-state waveguide, such as liquid crystal waveguide. However, in various other embodiments other non-mechanical beamsteering devices may be used, such as an optical phased array. The solid-state liquid crystal waveguide of one example may receive the transmitted pulsed laser beam via a fiber coupling from the laser radar optical source, and continuously scan the beam over a two dimensional angular range of 30° by 5°, 30° by 8°, or up to 50° by 15°. In certain implementations, the liquid crystal waveguide may be optically coupled with a polarization gratings stack to obtain a larger angular range and enable discreet course beamsteering. In one example, the solid-state liquid crystal waveguide includes a Steerable Electro-Evanescent Optical Reflector offered by Vescent Photonics, Inc. of Golden, Colo.

As discussed above, the non-mechanical beamsteering device 104 may receive one or more control signals for adjusting a refractive index of the non-mechanical beamsteering device 104. For example, the controller 110 may be configured to apply a control voltage (e.g., an analog control voltage) to the non-mechanical beamsteering device 104 to adjust the beamsteering of the device 104. In particular, the liquid crystal waveguide allows rapid adjustments of the direction of linear scans, which may be advantageous when an object within a scene is in motion. Rapid adjustments also permit multiple linear scans to be performed within a single frame of operation of the imaging system 100.

In contrast to conventional beamsteering approaches, which typically require beamforming optics positioned on a pivoted support structure to accurately direct a laser beam, examples of the non-mechanical beamsteering device 104 discussed herein remove the need for such mechanically cumbersome structures. Furthermore, the non-mechanical beamsteering device 104 may be controlled to direct a pulsed laser beam generated by a single optical source (e.g., the laser radar optical source 102) over an area of the scene in one or more linear scans. Such an implementation also avoids the need for multiple laser sources to selectively illuminate a desired field of view, as required by other conventional beamsteering approaches. Additional optical sources can significantly increase the weight and cost of the imaging system. Accordingly, in addition to the various technical advantages discussed above, the non-mechanical beamsteering device 104 of various aspects and embodiments improves the speed and accuracy of the imaging system 100, as well as reduces the overall weight of the system 100, when compared to conventional approaches.

In various embodiments, the laser radar detector 106 is positioned to receive, at an active portion of the detector (shown as active portion 122), a reflection of the pulsed laser beam reflected from the scene. For example, the laser radar detector 106 may include a photodetector having a spectral band chosen to match the wavelength of the pulsed laser beam emitted by the laser radar optical source 102. In many instances, the reflection of the pulsed laser beam may correspond to an area of the scene 114 that includes a portion of an object (e.g., sign 116). When activated, individual photo-sensitive detector elements (e.g., unit cells) within the laser radar detector 102 integrate photons of radiation impinging on the detector element. A circuit within each detector element of the laser radar detector 106 accumulates charge corresponding to the incident radiation. At the end of an integration period, the ROIC 108 may be configured to deactivate the activated detector elements, and provide a read-out signal to the controller 110 based on the accumulated charge. As discussed in further detail below, each read-out signal may have a corresponding signal level. In at least one example, each signal level refers to the strength (e.g., power) of the read-out signal, which may be based on the flux of reflections received.

In various embodiments, the laser radar detector 106 may include an array of detector elements, such as complementary metal-oxide semiconductor (CMOS) sensors or charge coupled devices (CCD). As discussed in further detail below with reference to FIGS. 3A-3B and FIGS. 4A-4B, in various embodiments the laser radar detector 106 may include one or more rows or columns of detector elements, and in certain embodiments include a single linear array of detector elements, or a single detector element.

As FIG. 1 shows, the ROIC 108 may be coupled and in communication with at least the laser radar detector 106 and the controller 110. In particular, the ROIC 108 may be coupled and in communication with each detector element of the laser radar detector 106. The ROIC 108 is configured to activate detector elements of the laser radar detector 106 and generate one or more read-out signal based at least in part on the integrated charge corresponding to reflections of the pulsed laser beam received at the laser radar detector 106. For instance, the ROIC 108 may include a double-buffer and a multiplexer, configured to sequentially draw charges from the laser radar detector and generate a continuous data stream to the controller 110. In various embodiments, the ROIC 108 is configured to activate a portion of the laser radar detector 106 that corresponds to the area of the scene illuminated by a current linear scan. For example, the ROIC 108 may be synchronized with the non-mechanical beamsteering device 104 to operate in a rolling-shutter mode of operation.

Accordingly, the ROIC 108 may be configured to activate detector elements of the laser radar detector 106 in a row-by-row arrangement. In such an embodiment, the non-mechanical beamsteering device 104 directs the pulsed laser beam over the areas of the scene 114 corresponding to the activated rows, and not over those areas of the scene 114 that correspond to inactive detector elements. For example, the ROIC 108 may generate a synchronization signal, based on which the non-mechanical beamsteering device 104 may synchronize with the laser radar detector 106. However, in other embodiments, a synchronization signal may be generated by the controller 110, or the laser radar optical source 102, and provided to each of the ROIC 108 and the non-mechanical beamsteering device 104. After the integration period has expired, the ROIC 108 is configured to read-out the current values of each detector element within the activated row, deactivate that row, and activate a new row of detector elements. Such embodiments are particularly advantageous for range detection operations because they permit the detection of objects within a scene (e.g., signs) that would otherwise go undetected if the entire scene was illuminated.

While discussed herein as in at least one embodiment including an array of detector elements, in various embodiments, the laser radar detector 106 may include a single linear array, or a single detector element. Such embodiments may further reduce the size, weight, and cost, of the imaging system. Detector elements may be arranged in any suitable pattern, such as rows and columns. FIG. 1 shows the laser radar detector 106 including an array composed of five rows of five detector elements for convenience of illustration. In particular implementations, the laser radar detector 106 may include a focal plane array (FPA) including 2048×2048 array of detector elements, a 320×256 array of detector elements, or a 640×480 array of detector elements. In certain embodiments, the beamwidth of the pulsed laser beam steered by the non-mechanical beamsteering device 104 may correspond to the dimensions of the laser radar detector 106, or the dimensions of the activated detector elements within the non-mechanical beamsteering device 104. "Row" and "column" as used herein, may be interchanged according to various embodiments. That is, although "row" may generally be used to refer to a horizontal positioning and "column" may generally be used to refer to a vertical positioning, as used herein, either may be used to refer to a horizontal positioning and a vertical positioning relative to the other.

In various embodiments, the non-mechanical beamsteering device 104 may be controlled to perform one or more linear scans of an area of the scene within a frame time of the imaging system 100. Specifically, the frame time may coincide with a single frame of operation of the laser radar detector 106. The frame rate of the laser radar detector 106 refers to the snapshot operation of each individual detector element of the laser radar detector 106, and the frequency at which the imaging system 100 generates consecutive images (i.e., frames). In various embodiments, the rapid response of the non-mechanical beamsteering device 104 (in contrast to conventional mechanical devices) permits the one or more linear scans to be synchronized with the frame rate of the imaging system 100. For instance, in various embodiments each consecutive linear scan may start at the beginning of a frame of operation of the imaging system 100 and end at the end of the frame of operation. Similarly, the integration period of the detector elements within the laser radar detector 106 may substantially match the frame time of a single frame of operation.

The one or more read-out signals provided by the ROIC 108 may be received at the controller 110. The controller 110 may include a single controller; however, in various other embodiments the controller 110 may consist of a plurality of controllers and/or control circuitry. While the controller 110 is illustrated separate from one or more components of the imaging system, in various embodiments, the controller 110 may be combined with one or more other components, such as the ROIC 108. For instance, the controller 110, ROIC 108, and other combined components of the imaging system 100, may include a combination of software-configured elements, control circuitry, signal processing circuitry, application specific integrated circuitry, or any combination of various hardware and logic circuitry for performing the various processes discussed herein.

In various embodiments, the controller 110 includes a processor, data storage, a user interface, and one or more interfaces for system components, such as a communication interface. The processor may be coupled to the data storage, the communication interface, and the one or more other interfaces, and be configured to perform a series of instructions that result in manipulated data stored and retrieved from the data storage. The processor may include a commercially available processor, such as a processor manufactured by INTEL, AMD, MOTOROLA, or FREESCALE.

In additional examples, the processor may be configured to execute an operating system. The operating system may provide platform services to application software. These platform services may include inter-process and network communication, file system management, and standard database manipulation. One or more of many operating systems may be used, and examples are not limited to any particular operating system or operating system characteristic. In some examples, the processor may be configured to execute a real-time operating system (RTOS), such as RTLinux, or a non-real time operating system, such as BSD or GNU/Linux.

The instructions stored on the data storage may include executable programs or other code that can be executed by the processor. The instructions may be persistently stored as encoded signals, and the instructions may cause the processor to perform the functions and processes described herein, such as determining a range to a scene (including a portion of an object), identifying the presence of an object in a scene, detecting a spatial profile of an object, aggregating object data based at least in part on the detected spatial profile of the object, and generating an image of an object based on one or more read-out signals, from the ROIC 108. The data storage may include information that is recorded, on or in, the medium, and this information may be processed by the processor during execution of instructions. The data storage includes a computer readable and writeable non-volatile data storage medium configured to store non-transitory instructions and data. In addition, the data storage includes processor memory that stores data during operation of the processor.

Accordingly, in various embodiments, the controller 110 may determine a range to a first portion of an object within the scene 114 based on a time of flight of a reflection of the pulsed laser beam from that portion of the object. Subsequent determinations of a range to other portions of the object (i.e., a second portion, a third portion, etc.) may be based on further reflections from those portions of the object. In particular, each reflection of the pulsed laser beam may correspond to a linear scan performed by the non-mechanical beamsteering device 104. For example, the range to the first portion of the object may be determined based on the round trip time of the pulsed laser beam, the amount of the reflected pulsed laser beam, and the amount of the pulsed laser beam that is blocked. In particular, the controller 110 may start a time counter, which is stopped when radiation is received at the laser radar detector. The controller 110 may start the time counter when the pulsed laser beam is emitted by directly controlling the laser radar optical source 102, or by redirecting a small percentage of the output of the laser radar optical source 102. With the speed of the emitted pulsed laser beam being a known value, the controller 110 is configured to determine the range to a portion of the sign, and in subsequent scans additional portions of the object.

In particular embodiments, the controller 110 is configured to identify the presence of an object within the scene, and within the FOV of the imaging detector 106, based on the reflective characteristics (i.e., reflectivity) of at least a portion of that object. Specifically, the controller 110 may be configured to identify the presence of an object based on a signal level of one or more read-out signals from the ROIC 108. As discussed above, the signal level of a particular read-out signal may depend on the flux of the reflections of the pulsed beam collected, and accordingly will depend on the reflective nature of the reflecting area (e.g., the object and the scene). As such, the controller 110 may detect one or more disparities between signal levels to identify the presence of an object within the scene.

In at least one example, the controller 110 may compare a signal level of a first read-out signal and an average signal level of the scene to identify the presence of at least a portion of the object. For instance, in response to receiving the one or more read-out signals from the ROIC 108, the controller 110 may determine an average signal level for the scene by summing and averaging each respective signal level. Specifically, the controller 110 may calculate the average based on the known power and determined range. The average signal level will hence correspond to an average reflective level of the scene. In particular, the controller 110 may calculate an average signal level for those read-out signals that cover the entire field of view of the laser radar detector 106. In certain embodiments, the controller 110 may detect a disparity between the signal level of the first read-out signal and the average signal level to identify the presence of at least a portion of the object. While in one example, the controller 110 may detect signal levels which are higher than the average signal level, in various other examples any disparity may be used.

In other similar implementations, the average signal level may be computed for a portion of the scene (i.e., an area less than the entire span of the scene) to further improve the accuracy of the imaging system 100. While in one implementation, objects to be detected may be provided with pre-determined highly reflective properties, in various other embodiments, objects (e.g., traffic signs) may naturally include a highly reflective surface, such as a reflective paint or tape. As further discussed below, in various embodiments the controller 110 is further configured to track and/or further interrogate a previously identified areas corresponding to high signal levels with one or more additional linear scans.

In certain embodiments, the controller 110 may also be configured to detect a spatial profile of the object within the scene based at least in part on the one or more read-out signals from the ROIC 108. Specifically, the controller 110 may be configured to detect a spatial profile based on a range to the areas of the scene scanned. As used herein, "spatial profile" may refer to the size, shape, external boundaries, or other surface characteristics of a particular object. Spatial profiles may be detected based on amplitude or range variations between reflections of the pulsed laser beam from portions of the object, and reflections of the pulsed laser beam from a background. That is differences in range between the object and the background. As discussed above, the area of the scene scanned by a linear beam may often include much more than a portion of the object within the scene. For instance, the area scanned may include various background scenery objects such as trees, foliage, buildings, and other landscape features. Accordingly, reflections received from the portions of the object scanned will be received at different times relative to reflections from the portions of the object (if those reflections are received at all). Accordingly, a step transition in the range to the portion of the object and the background may be used to ascertain that an edge or boundary of the object exists. Multiple linear scans of the scene may be used to detect every edge of the object, and construct a spatial profile of the object.

Figure 2:
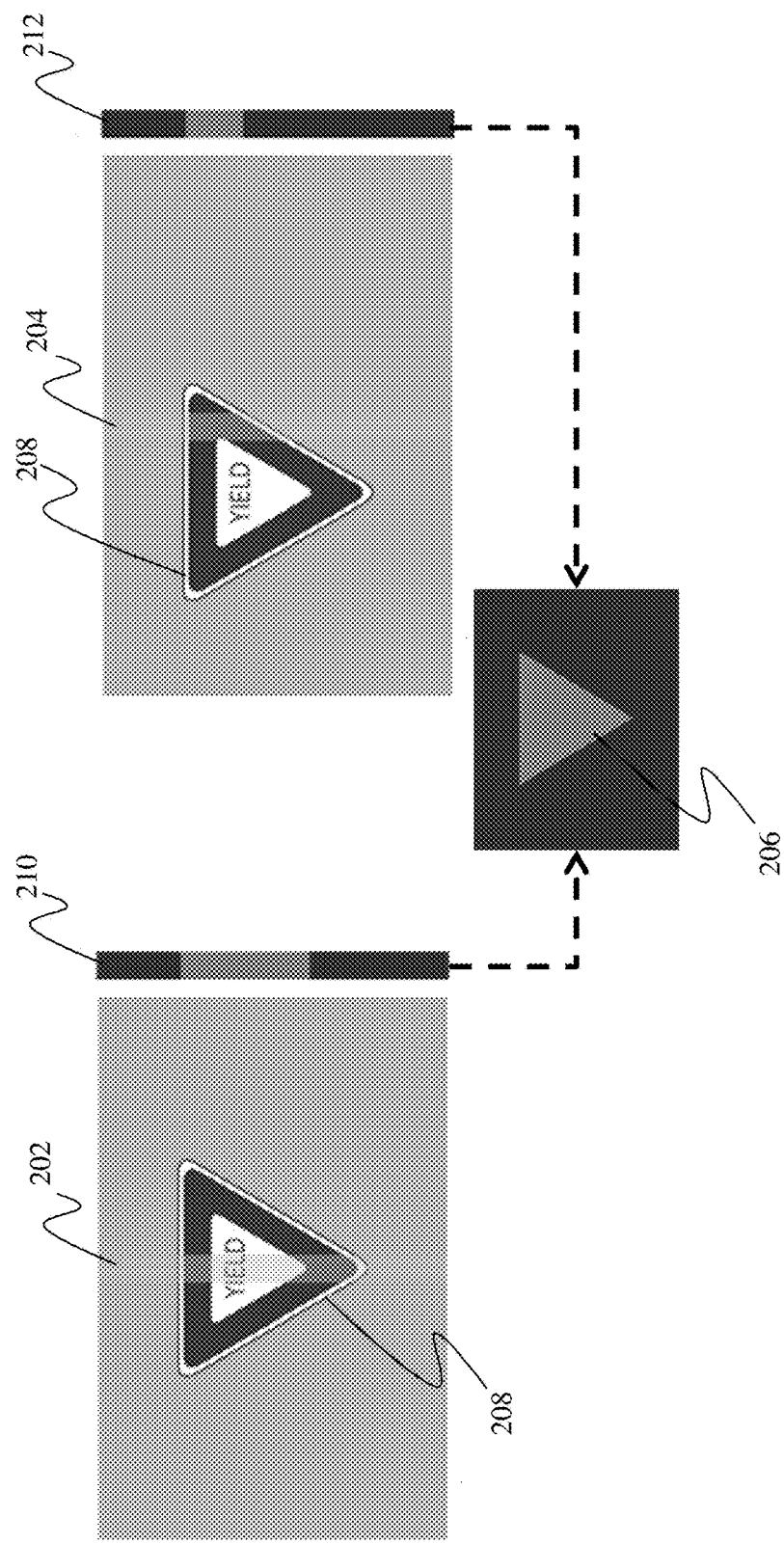
FIG. 2 is an example illustration of operation of the imaging system shown in FIG. 1, according to aspects of the invention.

Turning briefly to FIG. 2, shown is an example illustration of the generation of a spatial profile of an object (e.g., a traffic sign 208) based on one or more read-out signals from the ROIC 108 of the example imaging system 100 shown in FIG. 1. FIG. 2 is described with continuing reference to the imaging system 100 shown in FIG. 1. In particular, FIG. 2 shows read out values corresponding to at least two linear scans (e.g., a first linear scan 202 and a second linear scan 204) combined by the controller 110 to generate an image (shown as a spatial profile 206) of the detected sign 208 based on a range to each area of the scene. The first linear scan 202 of a first area of the scene illuminates a first portion of the sign 208 and a background of the sign within that area. A first scan measurement scale 210 is shown to represent the range of the first portion of the sign 208 from the imaging system 100, and a range of the background from the imaging system 100. As discussed herein, the range to the first portion of the sign 208 and the background may be determined based on reflections of the pulsed laser beam from the first area of the scene. While shown in the first scan measurement scale 210 as located at a discrete range, in various embodiments the background of the scene may include various objects (e.g., buildings, trees, foliage, etc.) positioned at different distances from the imaging system 100. Accordingly, in various implementations, the sign may be at one range from the imaging system 100, and the background may appear to be at various different ranges from the imaging system 100.

The second linear scan 204 of a second area of the scene illuminates a second portion of the sign 208 and the corresponding background, the second portion of the sign 208 being different from the first portion of the sign 208. For instance, the second portion may be directionally left or right of the first portion when viewing the sign 208 from the imaging system. A second scan measurement scale 212 is shown to represent the range of the second portion of the sign 208 from the imaging system 100, and a range of the background of the sign 208 within the second area from the imaging system 100. As shown, scanning different areas of the scene in multiple linear scans enables the imaging system 100 to detect different portions of the sign 208, which may each be sequentially "pieced together" to generate an image (e.g., shown as the spatial profile 206) of the sign 208.

As discussed above, in various embodiments the controller 100 is configured to identify the presence of an object within a scene, such as the sign 208, based on the comparison a signal level corresponding to a reflectivity of at least a portion of that object relative to an average signal level corresponding to the reflectivity of the remainder of the scene. Responsive to identifying the presence of the object based on a disparity between the compared signal levels, the system 100 may further interrogate the object to determine additional information regarding the object. For example, as shown in FIG. 2, the system 100 may perform multiple linear scans to construct a spatial profile of the object. While in one embodiment, the object (e.g., sign 208) may include pre-determined highly reflective properties, in various other embodiments, the controller 110 is configured to identify the presence of the object based on one or more signal levels corresponding to a high reflectivity relative to an average reflectivity of the scene.

Returning to FIG. 1, in various embodiments the controller 110, responsive to detecting a spatial profile of the object, may aggregate additional information based on the detected spatial profile of that object. For instance, many traffic signs include alphanumeric, directional, or other information, printed on a surface of the traffic sign (e.g., a sign may have the letters "YIELD" printed on it). The controller 110 may use a look-up table to determine this additional object data based on the detected spatial profile. The object data look-up table may include an array that replaces a runtime computation with an indexing operation. For example, the object data look-up table may include an array of object data stored in static program storage, such as in a data store of the controller 110. The controller 110 may then use the additional object data to provide instructions or control signals to system coupled equipment to perform one or more additional operations. For example, in response to determining that the spatial profile of a detected object resembles an inverted triangle with rounded corners, the controller 110 may aggregate data corresponding to a YIELD traffic sign, and provide one or more control signals (or other communications) to a speed control system of an autonomous vehicle to adjust a speed of that vehicle. In certain embodiments, the controller 110 may perform one or more machine learning algorithms to recognize pre-defined shapes, objects, external boundaries, or other surface characteristics of an object.

Similarly, in various embodiments the controller 110 may be configured to generate one or more images based on reflections of the pulsed laser beam received from the area of the scene 114 scanned. Read-out signals of the ROIC 108 corresponding to one or more consecutive linear scans performed by the non-mechanical beamsteering device 104 may be used by the controller 110 to determine a range to each respective area of the scene, and linearly construct an image of the scene 114. Detected spatial profiles or generated images may be provided as an output of the controller 110. For instance, images may be provided to a user display. In particular embodiments, the system 100 further includes a housing 126 shaped to attach to a user. Specifically, the system 100 may include a goggle housing, with the fixed optical axis 124 aligned with a line of sight of the user (i.e., along boresight). In such an embodiment, images may be provided within the line of sight of the user to assist the user in walking. FIG. 5 shows an example side profile of an operator wearing the optical system 100 according to certain implementations. In FIG. 5, the line of sight of the operator is illustrated as ghost line 502. In various other embodiments, the housing 126 may be shaped to attach the system 100 to a vehicle or machinery, such as vehicle-mount housing or machinery-mount housing. In such embodiments, images may be provided to dynamically assist the vehicle, machinery, or user thereof, in operating or moving that vehicle or machinery.

Turning now to FIGS. 3A and 3B, shown are example illustrations of operation of the imaging system 100 shown in FIG. 1. FIGS. 3A and 3B are discussed within continuing reference to the example imaging system 100 shown in FIG. 1. In particular, FIG. 3A shows a first linear scan 302 of a first area of a scene 304 including a first portion of an object (e.g., sign 306), and FIG. 3B shows a second linear scan 316 of a second area of the scene 304 including a second portion of the sign 306.

As discussed in more detail with reference to FIG. 1, in various embodiments the laser radar detector 106 includes an array of photosensitive detector elements. FIG. 3A shows the laser radar detector 106 as having a five by five array of detector elements for the convenience of illustration. In particular implementations, synchronized activation of a portion of the detector elements and scanning of an area of the scene may significantly improve the efficiency and power consumption of the imaging system when compared to conventional laser radar imaging systems. In FIGS. 3A and 3B, activated detector elements are indicated by hashed lines (e.g., active detector elements 308), inactive detector elements are indicated by the absence of hashed lines (e.g., inactive detector elements 310), and the corresponding scanned area of the scene is indicated by the first scan 302 and the second scan 316. In particular, individual detector elements of the laser radar detector may be activated and deactivated in a row-by-row fashion. In FIG. 3A, the first row of activated detector elements is indicated generally by arrow 312.

FIG. 3B shows a subsequent scan (i.e., the second linear scan 316) of a second area of the scene 304 including a second portion of the sign 306. In various embodiments, after activating a first row of detector elements and scanning the first area of the scene 304 (as shown in FIG. 3A), the ROIC 108 is configured to activate a second row of detector elements and the non-mechanical beamsteering device 104 is configured to scan the pulsed laser beam over a second area of the scene including at least a second portion of the sign 306, and corresponding to the second activated row of detector elements. In FIG. 3B, the second row of activated detector elements is indicated generally by arrow 314. Read-out signals from the scans shown in FIGS. 3A and 3B may then be received by the controller 110 and used to generate an image of at least the sign 306 based on range.

The ROIC 108 and the non-mechanical beamsteering device 104 may perform one or more imaging or tracking operations based on a raster scan pattern. In such an embodiment, the non-mechanical beamsteering device 104 is configured to direct the pulsed laser beam and illuminate an area of the scene corresponding to the activated portion of the laser radar detector 106 during the raster scan pattern. In particular, such embodiments of the ROIC 108 may be configured to activate a row of detector elements of non-mechanical beamsteering device in a raster pattern, the row of detector elements being less than the entire array of the laser radar detector 106. In the raster scanning pattern, the ROIC 108 is configured to activate rows of detector elements within one or more horizontal strips. For instance, with reference to FIG. 3A, the ROIC 108 may be configured to sweep from the top of the laser radar detector 106 to the bottom, or from the bottom to the top of the laser radar detector 106 in a row by row fashion. Simultaneously (e.g., based on the same synchronization signal), the non-mechanical beamsteering device 104 is configured to scan the pulsed laser beam emitted by the laser radar optical source 102 over each area of the scene corresponding to the currently activated row of detector elements during the raster scan selected pattern.

In certain other embodiments, the non-mechanical beamsteering device 104, the laser radar detector 106, and the ROIC 108, are configured to operate in accordance with a search and track mode of operation. In a search and track mode of operation the non-mechanical beamsteering device 104 and ROIC 108 are synchronized such that non-mechanical beamsteering device 104 scans the field of view of the laser radar detector 106 during a searching mode of operation to locate an object. Location of the object may be based on one or more generated images, one or more signal levels, or detection of a spatial profile of the object, as discussed above. Once located, the system 100 may perform one or more tracking operations during which areas of the scene including the object are retraced with one or more additional linear scan to further obtain image data regarding the object. In further embodiments, the searching mode of operation may be initiated by receipt of an input (e.g., a user input) identifying an intended object to be detected. For instance, a user may indicate that they wish for the system to locate traffic signs, and in particular speed limit signs.

Turning now to FIGS. 4A and 4B, shown are additional example illustrations of operation of the imaging system 100 shown in FIG. 1. FIGS. 4A and 4B are discussed with continuing reference to the example imaging system 100 shown in FIG. 1. In particular, FIG. 4A shows a first linear scan 402 of a first area of a scene 404 including a first portion of an object (e.g., sign 406), and FIG. 4B shows a second linear scan 412 of a second area of the scene 404 including a second portion of the sign 406.

As discussed in more detail with reference to FIG. 1, in certain embodiments the laser radar detector 106 includes a single linear array of detector elements (e.g., a single linear row of detector elements indicated by arrow 408). FIGS. 4A-4B show the laser radar detector 106 of one such an embodiment. In such an embodiment, the system 100 may further include focusing optics, such as a cylindrical lens, to focus the received reflection onto the single linear array. In one example, the cylindrical lens has a short focal length to accept light over the entire full field of view. A single linear array of detector elements may further improve the size, weight, and cost, of the imaging system, when compared to conventional imaging systems. In such an arrangement, reflections of the pulsed laser beam may be directed to the same row of detector elements, regardless of the area scanned by the non-mechanical beamsteering device. Accordingly, the same row of detector elements may be activated for each consecutive scan.

Activated detector elements are indicated in FIGS. 4A-4B by hashed lines (e.g., active detector elements 410). In particular, FIG. 4A shows the single linear row of detector elements activated for the first linear scan 402. Similarly, FIG. 4B shows the single linear row of detector elements activated for the second linear scan 412. In such an arrangement, each pixel receives reflections of the pulsed laser beam for multiple consecutive scans, and the controller uses knowledge of the corresponding area scanned to construct an image of the scene. In particular, the controller may assign the received signal from the ROIC to the appropriate area of the scene based on knowledge of the control signals provided to the beamsteering device (e.g., one or more beamsteering commands).

Figure 6:
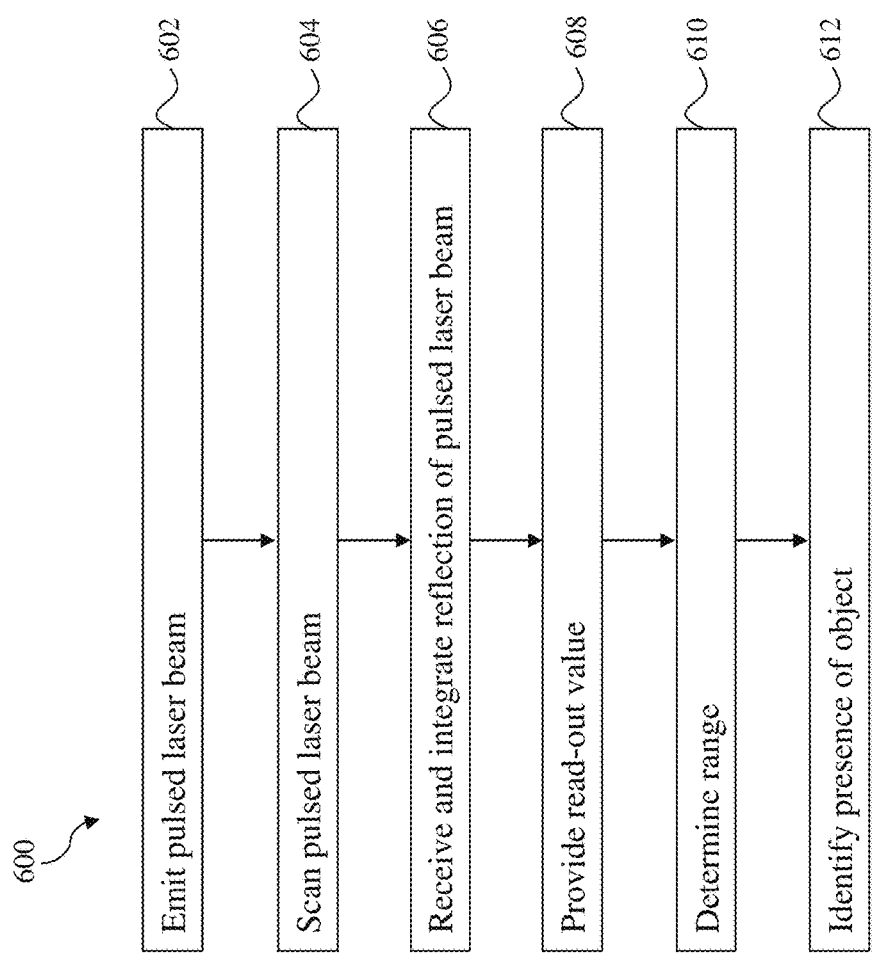
FIG. 6 is an example process flow according to aspects of the invention.

As described above with reference to FIGS. 1, 2, 3A-3B, and 4A-4B, several embodiments perform processes that improve known schemes for laser radar imaging. In some embodiments, these processes are executed by an imaging system, such as the imaging system 100 described above with reference to FIG. 1. One example of such a process is illustrated in FIG. 6. According to this example, the process 600 may include the acts of emitting a pulsed laser beam, scanning the pulsed laser beam in a linear scan, receiving and integrating a reflection of the pulsed laser beam, providing a read-out signal based on the integrated reflection of the pulsed laser beam, determining a range to at least a portion of an object based on the read-out signal, and identifying the presence of the object. Process 600 is described with continuing reference to the example imaging system 100 shown in FIG. 1.

It is appreciated that in various embodiments the acts 602-610 may be performed in the order discussed below. However, in various other embodiments, acts 602-610 may be performed in any other suitable order, and each particular act may be performed for any suitable number of iterations. For instance, in certain embodiments, the process 600 may include scanning the pulsed laser beam (as discussed with reference to act 604) at substantially the same time as, or prior to, emitting a pulsed laser beam (as discussed with reference to act 602). In another example, the process 600 may include performing multiple linear scans (as discussed with reference to act 604) prior to determining a range to a first portion of an object (as discussed with reference to act 610).

In act 602, the process 600 includes emitting from the laser radar optical source 102 a pulsed laser beam along the fixed optical axis. As discussed above with reference to FIG. 1, the laser radar optical source 102 may include any suitable source of NIR light. Accordingly, in various embodiments emitting a pulsed laser beam may include emitting a pulsed laser beam having an eye-safe wavelength of 1,550 nm. In other embodiments, emitting the pulsed laser beam may include emitting a laser beam having a wavelength of 1,064 nm. In one particular example, the laser radar optical source 102 may emit a pulsed laser beam at 1 µJ at pulse width of 10 nanoseconds, and a repetition rate of 10 kHz.

In act 604, the process may include receiving the pulsed laser beam from the laser radar optical source at the non-mechanical beamsteering device 104 positioned along the fixed optical axis. For example, the non-mechanical beamsteering device 104 may receive the pulsed laser beam by an optical fiber or free space coupling. Responsive to receiving the pulsed laser beam from the laser radar optical source 102, act 604 includes scanning the pulsed laser beam in one or more linear scans over one or more areas of the scene to be imaged. For instance, the non-mechanical beamsteering device 104 may receive one or more control signals, such as an applied voltage, to adjust a refractive index of the non-mechanical beamsteering device 104 and direct the pulsed laser beam.

In certain embodiments, scanning the pulsed laser beam in a linear scan over an area of the scene may include scanning the pulsed laser beam over at least a first portion of an object within that area. As discussed with reference to FIG. 1, objects may include signs or any informational object or device. In particular embodiments, the process 600 may include controlling the non-mechanical beamsteering device 104 to perform one or more consecutive linear scans over the scene, each linear scan corresponding to a different area of the scene. For instance, the process 600 may include scanning the pulsed laser beam over a first area of the scene, and responsive to completing the scan, scanning the pulsed laser beam over a second area of the scene. Such a process may be repeated for any number of desired scans, or until an entire spatial profile of the object has been detected. Furthermore, the process 600 may include scanning the pulsed laser beam over a previously scanned area of the scene to retrace a previous scan. In various embodiments, the scanned area of the scene is substantially less than an entire span of the scene.

Still referring to act 604, in certain embodiments scanning the pulsed laser beam over the area of the scene during a linear scan may include directing the pulsed laser beam within the field of view of the laser radar detector 106. In particular, the area scanned (i.e., illuminated) by the pulsed laser beam may be less than the field of view of the laser radar detector 106. The process 600 may also include the act of synchronizing the one or more linear scans to correspond to the active portions of the laser radar detector 106. That is, the non-mechanical beamsteering device 104 may direct a first linear scan over only an area of the scene corresponding to a first active portion of the laser radar detector 106.

In act 606, the process 600 may include receiving and integrating, at an active portion of the laser radar detector 106, a reflection of the pulsed laser beam corresponding to the area of the scene scanned. Responsive to receiving the reflection of the pulsed laser beam, the process 600 may further include providing at least one read-out signal from the ROIC 108 coupled to the laser radar detector 106, the read-out signal being based at least in part on the integrated reflection of the pulsed laser beam (act 608). For multiple linear scans, such acts may include providing a first read-out signal for reflections corresponding to a first area of the scene (illuminated during a first linear scan), and providing a subsequent read-out signal for reflections corresponding to another area of the scene (illuminated during a subsequent linear scan). For one or more subsequent linear scans, the ROIC 108 may activate detector elements of the laser radar detector in a row-by-row arrangement. As such, acts performed with reference to FIG. 6 may operate according to a rolling-shutter mode of operation.

In act 610, the process 600 may include receiving the one or more read-out signals from the ROIC 108 at the controller 110, and determining a range to a portion of the object based at least in part on a time of flight of the pulsed laser beam. The process 600 may further include determining a range to other portions of the object (i.e., a second portion, a third portion, etc.) based on further reflections from those portions of the object. In particular, each reflection of the pulsed laser beam may correspond to a linear scan performed by the non-mechanical beamsteering device 104.

In act 612, the process 600 may include identifying a presence of an object within the scene based at least in part on a signal level of at least one read-out signal. Specifically, the signal level may correspond to a reflectivity of at least a portion of the object within the scanned area of the scene. As discussed above, the signal level of a particular read-out signal may depend on the flux of the reflections of the pulsed beam collected, and accordingly will depend on the reflective nature of the reflecting area (e.g., the object and the scene). As such, the process 600 may include detecting one or more disparities between signal levels to identify the presence of an object within the scene.

In certain examples, the process 600 may include comparing a signal level for a first read-out signal to an average signal level of the scene to identify the presence of at least a portion of the object. For instance, in response to receiving the one or more read-out signals from the ROIC 108, the process 600 may include determining an average signal level for the scene by summing and averaging each respective signal level. The average signal level will hence correspond to an average reflective level of the scene. In further embodiments, the process 600 may include detecting a disparity between the signal level of the first read-out signal and the average signal level to identify the presence of at least a portion of the object. While in one example, the controller 110 may detect signal levels which are higher than the average signal level, in various other examples any disparity may be used.

In other similar implementations, the average signal level may be computed for a portion of the scene (i.e., an area less than the entire span of the scene) to further improve the accuracy of the imaging system 100. While in one implementation, objects to be detected may be provided with pre-determined highly reflective properties, in various other embodiments, objects (e.g., traffic signs) may naturally include a highly reflective surface, such as a reflective paint or tape.

In further embodiments, the process 600 may include the act of detecting a spatial profile of the object based at least in part on one or more detected ranges to the object. As discussed above, "spatial profile" may refer to the size, shape, external boundaries, or other surface characteristics of a particular object. Spatial profiles may be detected based on variations in an amplitude of the pulsed laser beam or range between the portion(s) of the object and a background. Such embodiments are further discussed above with reference to at least FIG. 2. In particular, multiple linear scans of the scene may be used to detect the edges or boundaries of the object, and construct a spatial profile of the object. In various embodiments, responsive to detecting a spatial profile of the object, the process 600 may include aggregating additional information based on the detected spatial profile of that object.

Similarly, in various embodiments the process 600 may include the act of generating one or more images based on the reflections of the pulsed laser beam received from the area of the scene scanned. Read-out signals of the ROIC 108 corresponding to one or more consecutive linear scans performed by the non-mechanical beamsteering device 104 may be used by the controller to linearly construct an image of the scene. Further acts of process 600 may also include providing detected spatial profiles or generated images to one or more additional system or downstream components such as a user display.

Accordingly, aspects and embodiments provide optical systems and methods for detecting objects in low-visibility and other restricted view conditions. In particular, aspects and embodiments include solid-state active components and non-mechanical optical elements for improved weight reduction and reduced power consumption during such conditions. For instance, one example of an imaging system includes a non-mechanical beamsteering device positioned to scan a pulsed laser beam in a linear scan over an area of a scene. Reflections of the pulsed laser beam from the area of the scene, and reflections from multiple consecutive linear scans over different areas of the scene, may be used to identify the presence of an object within the scene, locate and determine a range to that object, detect a spatial profile of that object, and/or generate an image of that object. Such aspects and embodiments provide improved practicality for mobile applications, such as laser range finding systems for autonomous vehicles, autonomous machinery, user-wearable devices, and other maritime, airborne, or space systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system comprising:
    a laser radar optical source positioned to emit a pulsed laser beam along a fixed optical axis;
    a non-mechanical beamsteering device positioned along the fixed optical axis to receive the pulsed laser beam from the laser radar optical source and to scan the pulsed laser beam in a first linear scan over a first area of a scene and in a second linear scan over a second area of the scene;
    a laser radar detector positioned to receive and integrate, at a first active portion of the laser radar detector, a reflection of the pulsed laser beam from the first area of the scene, and at a second active portion of the laser radar detector, a reflection of the pulsed laser beam from the second area of the scene;
    a read-out integrated circuit (ROIC) coupled to the laser radar detector and configured to provide a first read-out signal based at least in part on the integrated reflection of the pulsed laser beam corresponding to the first area of the scene and a second read-out signal based at least in part on the reflection of the pulsed laser beam corresponding to the second area of the scene; and
    a controller coupled to the ROIC and configured to:
        receive the first read-out signal and the second read-out signal;
        determine a range to the first area of the scene based at least in part on a time of flight of the pulsed laser beam of the first linear scan;
        determine a range to the second area of the scene based at least in part on a time of flight of the pulsed laser beam of the second linear scan;
        identify a presence of an object within the scene based at least in part on a first signal level of the first read-out signal, the first signal level corresponding to a reflectivity of at least a portion of the object within the first area of the scene; and
        generate an average signal level for the scene, the average signal level corresponding to an average of at least the first signal level of the first read-out signal and a signal level of the second read-out signal.

2. The imaging system according to claim 1, wherein the controller is further configured to generate an image of the object within the scene based at least in part on the range to the first area of the scene and the range to the second area of the scene.

3. The imaging system according to claim 2, wherein the controller is further configured to detect a spatial profile of the object, and aggregate object data based at least in part on the detected spatial profile.

4. The imaging system according to claim 1, wherein in identifying the presence of the object, the controller is further configured to compare the first signal level and the average signal level for the scene and detect a disparity between the first signal level and the average signal level.

5. The imaging system according to claim 1, wherein the non-mechanical beamsteering device is further configured to synchronize at least the first linear scan to correspond to the first active portion of the laser radar detector.

6. The imaging system according to claim 5, wherein the photodetector includes a single linear array of detector elements.

7. The imaging system according to claim 1, wherein the non-mechanical beamsteering device, the laser radar detector, and the ROIC are configured to operate in accordance with a search and track mode of operation, and wherein during the search and track mode of operation the non-mechanical beamsteering device and laser radar detector are synchronized.

8. A method for optical imaging, the method comprising:
emitting from a laser radar optical source a pulsed laser beam along a fixed optical axis;
scanning with a non-mechanical beamsteering device the pulsed laser beam in a first linear scan over a first area of a scene;
receiving and integrating, at a first active portion of a laser radar detector, a reflection of the pulsed laser beam from the first area of the scene;
scanning with the non-mechanical beamsteering device the pulsed laser beam in a second linear scan over a second area of the scene;
receiving and integrating, at a second active portion of the laser radar detector, a reflection of the pulsed laser beam from the second area of the scene;
providing a first read-out signal from a read-out integrated circuit (ROIC) coupled to the laser radar detector, the first read-out signal being based at least in part on the integrated reflection of the pulsed laser beam corresponding to the first area of the scene;
providing a second read-out signal from the ROIC based at least in part on a reflection of the pulsed laser beam corresponding to the second area of the scene;
determining a range to the first area of the scene based at least in part on a time of flight of the pulsed laser beam of the first linear scan;
determining a range to the second area of the scene based at least in part on a time of flight of the pulsed laser beam of the second linear scan;
identifying whether an object is present within the scene based at least in part on a first signal level of the first read-out signal, the first signal level corresponding to a reflectivity of at least a portion of the object within the first area of the scene, by generating an average signal level for the scene corresponding to an average of at least the first signal level of the first read-out signal and a second signal level of the second read-out signal, comparing the first signal level and the average signal level, and detecting a disparity between the first signal level and the average signal level.

9. The method according to claim 8, further comprising generating an image of the object based at least in part on the range to the first area of the scene and the range to the second area of the scene.

10. The method according to claim 9, further comprising:
detecting a spatial profile of the object; and
aggregating object data based at least in part on the detected spatial profile.

11. An imaging system comprising:
a laser radar optical source positioned to emit a pulsed laser beam;
a non-mechanical beamsteering device positioned to receive the pulsed laser beam from the laser radar optical source, the non-mechanical beamsteering device being configured to scan the pulsed laser beam in a first linear scan over a first area of a scene including at least a portion of an object, and in a second linear scan over a second area of the scene;
a laser radar detector positioned to receive and integrate, at a first active portion of the laser radar detector, a reflection of the pulsed laser beam from the first area of the scene, and at a second active portion of the laser radar detector, a reflection of the pulsed laser beam from the second area of the scene, wherein a boresight of the laser radar detector is fixed to a line of sight of an operator;
a read-out integrated circuit (ROIC) coupled to the laser radar detector and configured to provide a first read-out signal based at least in part on the integrated reflection of the pulsed laser beam corresponding to the first area of the scene and a second read-out signal based at least in part on the reflection of the pulsed laser beam corresponding to the second area of the scene;
a controller coupled to the ROIC and configured to receive the first and second read-out signals, determine a range to the first portion of the object based at least in part on a time of flight of the pulsed laser beam of the first linear scan, determine a range to the second area of the scene based at least in part on a time of flight of the pulsed laser beam of the second linear scan, identify a presence of the object within the scene based at least in part on a first signal level of the first read-out signal, the first signal level corresponding to a reflectivity of the portion of the object within the first area of the scene, and generate an average signal level for the scene, the average signal level corresponding to an average of at least the first signal level of the first read-out signal and a signal level of the second read-out signal; and
a housing configured to couple the imaging system to the operator.

12. The imaging system according to claim 11, wherein the housing includes at least one of a goggle housing, a vehicle-mount housing, and a machinery-mount housing.

13. The imaging system according to claim 11, wherein the non-mechanical beamsteering device, the laser radar detector, and the ROIC, are configured to operate in accordance with a search and track mode of operation, and wherein during the search and track mode of operation the non-mechanical beamsteering device and laser radar detector are synchronized.

14. The imaging system according to claim 11, wherein in identifying the presence of the object, the controller is further configured to compare the first signal level and the average signal level for the scene and detect a disparity between the first signal level and the average signal level.

* * * * *

UNITED STATES PATENT AND TRADEMARK OFFICE
CERTIFICATE OF CORRECTION

PATENT NO. : 10,267,915 B2
APPLICATION NO. : 15/175807
DATED : April 23, 2019
INVENTOR(S) : Gerald P. Uyeno et al.

Page 1 of 1

It is certified that error appears in the above-identified patent and that said Letters Patent is hereby corrected as shown below:

In the Specification

Column 2, Line 51, delete "ROTC" and insert -- ROIC --.

Column 2, Line 65, delete "(ROTC)" and insert -- (ROIC) --.

Column 7, Line 18, delete "at 10" and insert -- at 1μJ --.

Signed and Sealed this
Eighteenth Day of June, 2019

Andrei Iancu
*Director of the United States Patent and Trademark Office*